United States Patent [19]

Dunaway, Sr.

[11] Patent Number: 5,234,892

[45] Date of Patent: Aug. 10, 1993

[54] METHOD OF TREATING LETHAL YELLOW IN PALM TREES

[76] Inventor: James K. Dunaway, Sr., 32321 Kinne Pearce Rd., Leesburg, Fla. 34788

[21] Appl. No.: 601,680

[22] Filed: Oct. 23, 1990

[51] Int. Cl.$^5$ .................. C05G 3/02; A01N 57/12; A01N 43/52

[52] U.S. Cl. .................. 504/101; 514/119; 514/395

[58] Field of Search .................. 71/3; 514/119, 395; 504/101

[56] References Cited

U.S. PATENT DOCUMENTS 4,146,646  3/1979  Pereival et al. .................. 424/324
4,339,443  7/1982  Baillie et al. .................. 424/200
4,402,725  9/1983  Heller et al. .................. 71/3

*Primary Examiner*—Richard L. Raymond
*Assistant Examiner*—S. Mark Clardy
*Attorney, Agent, or Firm*—Frank B. Robb

[57] ABSTRACT

A composition for treatment of diseases of palm trees of various varieties, which composition includes soluble all purpose fertilizers with trace elements, a systemic insecticide, a fungicide, a sticker, all mixed in water and applied to saturate the leaves of a tree, under pressure at a predetermined volume and quantity per tree, with particular attention to direct the mixture to the crown of the tree.

5 Claims, No Drawings

METHOD OF TREATING LETHAL YELLOW IN PALM TREES

GENERAL BASIS FOR THE INVENTION

The primary objective of this application is to provide a method of and composition for the treatment of palm trees particularly a treatment for the disease known as "Lethal Yellow", which has destroyed and is currently destroying thousands of palm trees of various species throughout the United States, particularly Florida and also in other states and countries where palm trees grow.

BACKGROUND OF THE INVENTION

The broad statement to be understood in the consideration of the matter presented here, involves the desirability of providing some way of eliminating the disease known as Lethal Yellow and prevent the same from destroying palm trees of various species whether they be of the Jamaican tall variety, Malayan or other hybrids. Particularly affected are coconut palms which are planted and grown to provide coconut for their various uses, or as ornamentals.

As a result of long examination and continued study of the problems relating to the ultimate result known as Lethal Yellow, I have found that there are several areas which need to be addressed to deal with this disease, which is particularly difficult to deal with because of the kind of tree or plant which the palm tree actually is, namely what is known as a class of tree or class of plant of the Monocotyledon type. This tree is a very primitive type of plant and does not in general regenerate cell tissue when injured, but needs nutrient fertilizers to meet the conditions which are encountered by palm trees in growth in various areas including freezing temperatures and other traumatic effects upon the plant itself.

The Palm is a Monocotyledon, for example, is in a primitive plant class, and as such is a variety of tree which needs abundant nutritional fertilizer to thrive and to prosper under current existing conditions.

Palm trees which are under stress and have cell tissue damage from cold, must rely on stored nutrients. When these are lacking, malnutritional disorders become evident and fungal diseases, such as *Phytophora palmivora* (but rot), *fusarium* and *pseudomonas* often infect and most always kill the trees as primary or secondary diseases.

Thus it has been found that specially blended soluble fertilizers and pesticides also control various diseases as well as the "Lethal Yellow" which is most cases is incorrectly diagnosed because the symptoms are almost identical.

It is noted that one of the primary problems which necessitates the treatment of palm trees which are affected by the Lethal Yellow disease, is to prevent the spread of the same from tree to tree or from an infected tree to nearby presumably healthy trees.

To this end the desirability of removal of dead or dying trees and particularly of those that are dying and in the initial stages of the dying process becomes apparent, so that whatever is causing the problem which will be addressed subsequently can be prevented from spreading.

I have found during the course of my research in this area that there is in fact a basis for the Lethal Yellow which comes from an organism called a mycoplasma, a pneumonia-like organism which is spread from one tree to another by "vectors", which are often in the form of leaf hoppers, flies, and other insects carrying the mycoplasma.

The control of "Lethal Yellow" is accomplished with a systemic insecticide upon contact, or when the insect feeds upon the tree, or lays its eggs in the meristem. The fertilizers which are used herein, kill the fungal diseases which are brought in by the insects.

DETAILED DESCRIPTION OF THE INVENTION

With the forgoing understanding of the general background and areas which relate to the disease known as Lethal Yellow, it being understood that this is a particular area which is addressed by this concept. However, while I recognize that there are other treatments which might be availed of, this particular method and composition for dealing with Lethal Yellow has been found to be virtually completely effective. It is thus of particular value when it comes to dealing with the various types of palms and where the composition and the method have been tested, substantial data supporting the same have been accumulated.

As a matter of fact a specific formula has been developed to include complete major and minor elements of soluble fertilizers with systemic insecticides and/or fungicides and what is known as a sticker.

The detailed aspects of this particular concept are dealt with subsequently and in fact specific formulations involved are set forth, to provide a basis for the formulating and delivering of a composition which has been found particularly effective in dealing with the disease of which this disclosure is primarily the subject.

With that in mind therefore, the recommended chemicals and soluble fertilizers are found to comprise the following:

| 20-20-20 Soluble Fertilizer Soluble trace Element Mix including: | |
| --- | --- |
| S. - Sulphur | 14.00% |
| B. - Boron | 1.35% |
| Cu. - Copper | 3.20% |
| Fe. - Iron | 7.50% |
| Mn. - Manganese | 8.00% |
| Mo. - Molybdenum | 0.04% |
| Zn. - Zinc | 4.50% |

The above listed chemicals and soluble fertilizers are then mixed in a solution so that a particular mix is provided as follows:

4 lbs. of the 20-20-20 Soluble Fertilizer including all of the Major elements 1 lb. Soluble trace or minor elements 1 lb. Or 1 qt. of Nu-Film 17 sticker 1 lb. Benomyl systemic fungicide, varying depending upon the different vectors involved.

1 lb. Methromyl systemic insecticide, which may vary with different vectors.

Mixed with 100 gallons of water, this mixture will treat 20 medium sized 10 to 20 foot coconut palms.

As will be understood from the foregoing, those are specific compositions provided and the method of delivery of the composition is ultimately presented. While the composition, which will be understood involves name brands fungicides and insecticides those being specifically set forth are proprietary with the name of the company which manufactures the same being given. This is not to say that products of other companies may not be used, these named having been proven effective.

In applying the composition above set forth, it is noted that the same is delivered by hydraulic spray with 400 to 1500 pressure at 10–35 G.P.M. volume. It is sprayed from the ground or from the air and as such is intended to saturate the tree and all of its parts.

If the saturation is effected from the ground, the palm trees should be provided with 5–7 gallons of the formula making sure to concentrate upon the central portion of the palm tree crown.

It is necessary to spray all the palm trees within a diseased target area in the shortest possible period of time. It should be stated that all trees should be sprayed at least twice each year. Where there are heavy infestations and individual trees with Lethal Yellow symptoms, the spray should be provided additionally very two weeks until the disease is brought under complete control.

The unusually high concentrations of trace elements in the formula, not only as necessary elements for the rejuvenation of new cell tissue, but are also available as fungicides capable of killing the fungal diseases referred to heretofore.

In epidemic areas where the treatment is used the trees turn green immediately and new fronds appear. New blooms also appear and fruit sets.

The diseases diminish and complete control of the diseases is accomplished in three to four months, depending on the epidemic concentration.

It has been discovered that fifty two different species of palm trees are susceptible to the disease and symptoms of Lethal yellow may vary. These must be thoroughly understood and recognized before the tree dies, by people who are capable of recognizing symptoms.

It is noted that the 20-20-20 all purpose fertilizer includes the typical elements thereof. A typical analysis is set forth below, the 20% nitrogen provided as detailed, and the other parts also detailed and commonly recognized;

| | |
|---|---|
| 6.22% Nitrate Nitrogen | |
| 3.88% Ammoniacal Nitrogen | |
| 9.90% Urea Nitrogen | |
| Available Phosphoric Acid ($P_2O_5$) | 20% |
| Soluble Potash ($K_2O$) | 20% |

The trace element mix included as part of the soluble minor elements, is mixed with the 20-20-20 soluble fertilizer to provide the composition above generally referred to and specifically described.

One of the most severe problems that is involved in dealing with the Lethal Yellow disease, is to identify the time in which the tree is most generally initially affected and before the actual results of infestation are really noticed. If this effectuated by an inspection that will indicate that the meristem of the tree is in fact infected with the vectors previously mentioned, such as to involve the pneumonia-like organism called mycoplasma, the tree heart or meristem should be excised and disposed of by burning to prevent the infestation from spreading.

Obviously this is a very technical problem which is subject to considerable difficulty, but one which, if found in time will prevent the spread of Lethal Yellow from tree to tree and thereby prevent the destruction of vast numbers of trees.

It may be pointed out further that the primary approach provided by this invention is to treat infected areas which involve palm trees of the monocotyledon class. It is also to be understood that a large part of the problem is related to malnutritional disorders of the palm plant itself, which needs considerable fertilization and thus the fertilizer alone will help to combat the spread of the disease.

This is particularly true if the fertilization takes place in an initial stage before any infestation of vectors is present.

This is always true in the instance of the class of plants which are primitive such as the monocotyledon and they require the maximum amount of fertilizer to deal with the problem which are possibly present. The fertilizer in the instance provided by the composition hereof is absorbed immediately and as such effects the treatment desired instantaneously.

The fact that the plant is to be saturated by high pressure spray is important since this adds to the value of the treatment. The use of the sticker so called is to make possible the retention of the treatment on the plant and thus its value increased over time. The sticker preventing any mere run off of the composition without effecting its desired end.

The fact that a sticker is used, this being a commonly availed of item, is important in the long term treatment as will be understood.

It is also to be understood that whereas there is specified a complete formula, certain elements of the formula may be more effectively utilized by certain types of trees. Thus in some cases where no fungicide is needed, that can be reduced or eliminated from the composition or on the other hand fertilizer can be reduced. However, fertilization is one of the aspects of the treatment provided hereby.

Whereas the monocotyledon class of plant is one which is of the primitive nature before stated, it is important to note that it does not regenerate damaged cell tissue, as is true of other classes of plants known as dicotyledons. In these latter plants there is a regeneration of cell tissue and the need for fertilization is considerably reduced as compared with palm trees as herein described. The great probability of fungal diseases is also minimized in dicotyledons, whereas it is maximized in monocotyledons.

I claim:

1. A method of treating palm trees to combat Lethal Yellow comprising spraying a mixture of all purpose soluble fertilizer, and trace element mix fertilizer to saturate at least the top foliage of the tree with at least five gallons of the mixture under pressure of 400 psi. at a rate of at least 10 gallons per minute, wherein the mixture includes a systemic fungicide.

2. The method of claim 1, wherein the mixture includes a systemic insecticide.

3. The method of claim 1, wherein the mixture includes a systemic fungicide and a systemic insecticide.

4. The method of claim 3, wherein the systemic fungicide includes 50% benomyl(methyl 1-(butylcarbamoyl)-benzimidazol-2-ylcarbamate) and 50% inert ingredients, and the systemic insecticide Dimethoate (0,0-Dimethyl S-((methylcarbamoyl)methyl), phosphorodithioate 23.4%, xylene-range aromatic solvent 40.0% inert ingredients 36.6%.

5. The method of claim 3, wherein the systemic fungicide includes 50% benomyl(methyl 1-(butylcarbamoyl)-benzimidazol-2-ylcarbamate) and 50% inert ingredients, and the systemic insecticide dimethoate (0,0-Dimethyl S-((methylcarbamoyl)methyl), phosphorodithioate 23.4 xylene-range aeromatic solvent 40.0% inert ingredients 36.6%, and a sticker.

* * * * *